US012727716B1

(12) United States Patent
Zhang et al.

(10) Patent No.: US 12,727,716 B1
(45) Date of Patent: Sep. 8, 2026

(54) HAND MIXER CAPABLE OF BEING HUNG ON CUP WALL

(71) Applicant: TANZHEXINGJI (Shanghai) Network Technology Co., Ltd, Shanghai (CN)

(72) Inventors: Kong Zhang, Shanghai (CN); YiTing Liu, Shanghai (CN)

(73) Assignee: TANZHEXINGJI (SHANGHAI) NETWORK TECHNOLOGY CO., LTD, Shanghai (CN)

(*) Notice: Subject to any disclaimer, the term of this patent is extended or adjusted under 35 U.S.C. 154(b) by 0 days.

(21) Appl. No.: 19/433,102

(22) Filed: Dec. 26, 2025

(30) Foreign Application Priority Data

Sep. 24, 2025 (CN) ......................... 202522059351.6

(51) Int. Cl.
*A47J 43/00* (2006.01)
*A47J 43/07* (2006.01)

(52) U.S. Cl.
CPC ................................ *A47J 43/0711* (2013.01)

(58) Field of Classification Search
CPC .............. A47J 43/0711; A47J 2031/165; A47J 43/1006; A47J 43/1012; A47J 43/1018; A47J 43/1031; A47J 43/082; A47J 2043/04427; A47J 43/0705; A47J 43/07
See application file for complete search history.

(56) References Cited

U.S. PATENT DOCUMENTS

| | | | | |
|---|---|---|---|---|
| 2,578,901 | A | 12/1951 | Schmidt | |
| 2,745,644 | A | 5/1956 | Behren | |
| 2,804,290 | A * | 8/1957 | Kaufman | A47J 43/044 74/DIG. 10 |
| 2016/0235250 | A1 * | 8/2016 | Bournay, Jr. | A47J 43/044 |
| 2022/0183507 | A1 * | 6/2022 | Petrosyan | A47J 43/044 |

OTHER PUBLICATIONS

The partial European search report of EP patent application No. 252279195 issued on Jun. 12, 2026.

* cited by examiner

*Primary Examiner* — Anshu Bhatia
(74) *Attorney, Agent, or Firm* — Frank Niranjan

(57) ABSTRACT

A hand mixer, including a handle, where an outer side of the handle is connected to a connecting member; and the connecting member includes a connecting portion and a limiting portion, the limiting portion is provided with a gap for accommodating the cup wall, the connecting portion is connected to the handle, and the connecting portion can move synchronously with the limiting portion and/or the connecting portion can move relative to the limiting portion. Therefore, the limiting portion is matched with the cup wall through the gap, so that the hand mixer is hung on the cup wall, long-time holding is avoided, and a collision between a whipping head and a cup bottom is avoided, thereby enabling the handle to shift or/and move to tilt and to slide or/and swing in different directions to facilitate stirring.

18 Claims, 13 Drawing Sheets

HAND MIXER CAPABLE OF BEING HUNG ON CUP WALL

TECHNICAL FIELD

The present invention relates to the technical field of hand mixers, and in particular to a hand mixer capable of being hung on a cup wall.

BACKGROUND

A hand mixer is a portable kitchen appliance, and is mainly used to mix, stir and whip various food ingredients. Meanwhile, the hand mixer structurally includes a handle and a stirring head. The stirring head rotates under the drive of a motor, and can adapt to different stirring requirements through different rotating speeds of the motor. Furthermore, there are various kinds of stirring heads, and one of the stirring heads is a whipping head for making milk foam. Meanwhile, during actual use, a user needs to hold the mixer all the time for operation and the mixer is in an inclined state, but long-time holding will make hands sore, thereby bringing discomfort to the user; and it is hard to control the position, resulting in collision between the whipping head and a cup bottom, thereby causing damage to the whipping head and the cup bottom.

SUMMARY

An objective of the present invention is to provide a hand mixer capable of being hung on a cup wall, the limiting portion is matched with the cup wall through the gap, so that the hand mixer is hung on the cup wall, long-time holding is avoided, and a collision between a whipping head and a cup bottom is avoided. Furthermore, a first connecting portion can move synchronously with the limiting portion and/or the first connecting portion can move relative to the limiting portion, thereby enabling the handle to shift or/and move to tilt and to slide or/and swing in different directions to facilitate stirring. Therefore, the problems that the hand mixer is required to be held for a long time and the whipping head collides with the cup bottom are solved.

The objective of the present invention is achieved as follows:

a hand mixer capable of being hung on a cup wall includes a handle, and an outer side of the handle is connected to a connecting member; and the connecting member includes a first connecting portion and a limiting portion, the limiting portion is provided with a gap for accommodating the cup wall, the first connecting portion is connected to the handle, and the first connecting portion can move synchronously with the limiting portion or/and the first connecting portion can move relative to the limiting portion.

Preferably, a pivot point is arranged between the first connecting portion and the limiting portion, and the first connecting portion can drive the handle to swing in forward, backward, left, right, upward and downward directions by taking the pivot point as a rotating center;

or the first connecting portion can drive the handle to swing forward and backward in a direction close to the center of a cup, or/and the first connecting portion can drive the handle to swing left and right in a plane perpendicular to the direction close to the center of the cup.

Preferably, the first connecting portion is elastic and deformable;

or/and at least one hinge shaft or hinge ball is arranged between the first connecting portion and the limiting portion.

Preferably, the first connecting portion and a shell of the handle are integrally formed;

or the first connecting portion and the handle are detachably connected.

Preferably, the first connecting portion and the handle are magnetically attracted by each other;

or the first connecting portion is sleeved outside the handle;

or the first connecting portion is embedded on the handle.

Preferably, the gap includes a clamping gap and a swinging gap which are distributed up and down, and the width of the swinging gap is greater than the width of the clamping gap.

Preferably, the gap is configured as a sliding gap for the connecting member to slide relative to the cup wall.

Preferably, the gap is formed at the bottom of the limiting portion.

Preferably, the limiting portion is a supporting plate, the limiting portion is connected to the first connecting portion through a mounting portion, and the gap is formed between the limiting portion and the first connecting portion.

Preferably, a supporting surface is formed at the bottom of the limiting portion, and an inclined surface is formed at the bottom of the limiting portion outside the supporting surface.

Preferably, the first connecting portion is ring-shaped;

or the first connecting portion is made of an elastic material, and an opening is formed in one side of the first connecting portion away from the limiting portion.

Preferably, the hand mixer capable of being hung on a cup wall further includes a whipping head, the whipping head is arranged on the handle, the whipping head includes a spring, a connecting rod and a mounting disk, and one end of the connecting rod is connected to the mounting disk and the other end of the connecting rod is connected to the handle; and a mounting groove is formed outside the mounting disk, the mounting disk is at least provided with a drainage hole for communicating upper and lower surfaces, and the spring is sleeved outside the mounting disk and located in the mounting groove.

Preferably, one side of the mounting disk away from the connecting rod is provided with a protrusion portion, an outer surface of the protrusion portion is arc-shaped, an inclined surface is arranged between the protrusion portion and the mounting disk, and the inclined surface is provided with the drainage hole.

Preferably, one side of the mounting disk close to the connecting rod is provided with a groove, and the groove communicates with the drainage hole.

Preferably, one end of the connecting rod connected to the handle is provided with a mounting member, and the mounting member is provided with a snap-fit port matched with the handle.

Preferably, a convex plate is arranged outside the mounting member, and the height of one end of the convex plate close to the mounting member is less than the height of one end of the convex plate away from the mounting member.

Preferably, a channel is formed in the middle of the mounting member, a convex strip is arranged on an inner wall of the channel, the snap-fit port is formed outside the mounting member and below the convex strip, and one end of the connecting rod connected to the handle is located in the channel and on the convex strip.

Preferably, the hand mixer further includes a whipping head, the whipping head is arranged on the handle, the whipping head includes a connecting ring and a connecting rod, and one end of the connecting rod is connected to the handle; and a second connecting portion connected to the connecting rod is arranged inside the connecting ring, a flat wire whisk and at least one reinforcing rib are arranged between an inner wall of the connecting ring and the second connecting portion, and the reinforcing rib is located on one side of the flat wire whisk away from the connecting rod.

Preferably, the reinforcing rib, the second connecting portion and the connecting ring are integrally formed;

or the reinforcing rib, the second connecting portion, the connecting ring and the flat wire whisk are formed by injection molding.

Preferably, the reinforcing rib is a long strip and located between the inner wall of the connecting ring and the second connecting portion, one side of the reinforcing rib away from the flat wire whisk is a cambered surface, and the height of the reinforcing rib is gradually increased in a direction close to the second connecting portion;

or the reinforcing rib is V-shaped and includes a first reinforcing strip and a second reinforcing strip, the joint of the first reinforcing strip and the second reinforcing strip is connected to the second connecting portion, the other ends of the first reinforcing strip and the second reinforcing strip are connected to the inner wall of the connecting ring, one side of the first reinforcing strip and one side of the second reinforcing strip away from the flat wire whisk are inclined surfaces, and the height of the reinforcing rib is increased gradually in a direction close to the connecting portion.

Preferably, the flat wire whisk is arranged at ¼ to ⅔ of the height of the connecting ring;

or/and the height of the connecting ring is greater than or equal to 5 mm.

Preferably, the height of one end of the second connecting portion away from the connecting rod is greater than the height of a lower surface of the connecting ring, and an outer surface of the end of the second connecting portion is a cambered surface;

or/and a second connecting groove is formed at one end of the second connecting portion close to the connecting rod, a first plane is formed on two sides of an inner wall of the second connecting groove, an end part of the connecting rod is located in the second connecting groove, and a second plane is formed outside the end part of the connecting rod and corresponding to the first plane.

Compared with the prior art, the present invention has the outstanding and beneficial technical effects as follows:

According to the present invention, the limiting portion is matched with the cup wall through the gap, so that the hand mixer is hung on the cup wall, long-time holding is avoided, and a collision between the whipping head and the cup bottom is avoided. Furthermore, the first connecting portion moves to enable the handle to move so as to change the stirring position and facilitate stirring. Specifically, the first connecting portion can move synchronously with the limiting portion so as to enable the handle to move and slide to change the stirring position of the handle, or/and the first connecting portion can move relative to the limiting portion to enable the handle to move, so that the handle inclines and swings in different direction to change the stirring position of the handle.

REFERENCE NUMERALS OF THE DRAWINGS

Figure 1:
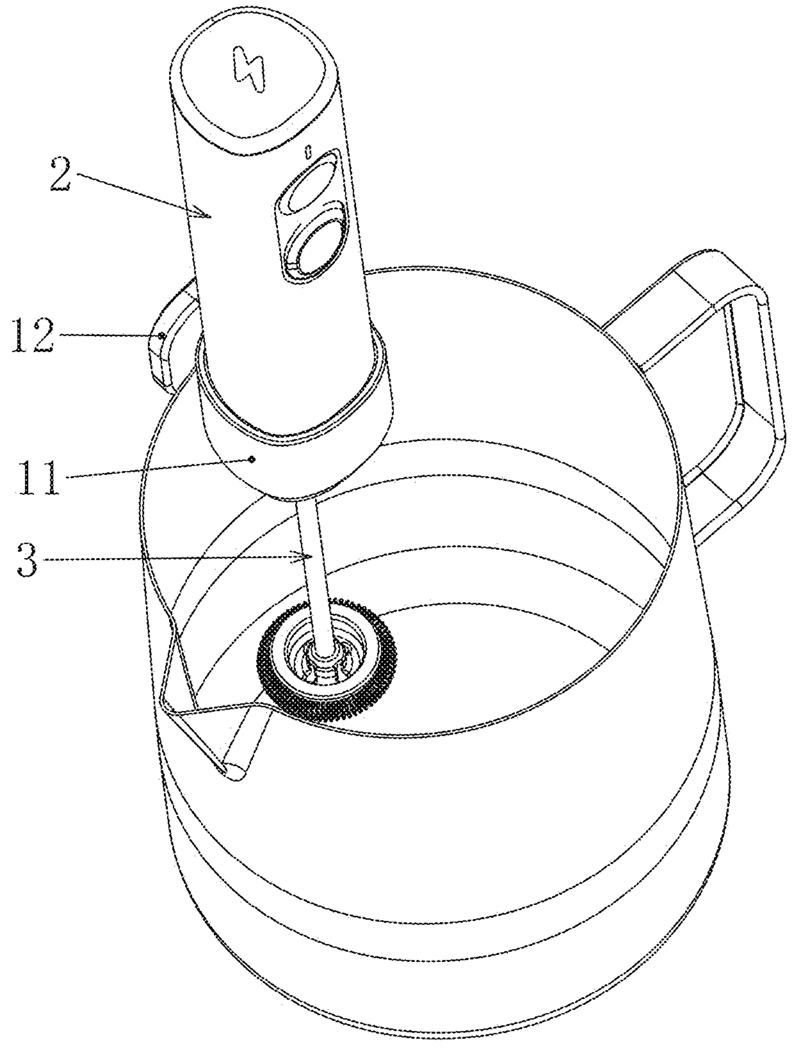
FIG. 1 is a structural schematic diagram of the present invention and a cup.
Figure 2:
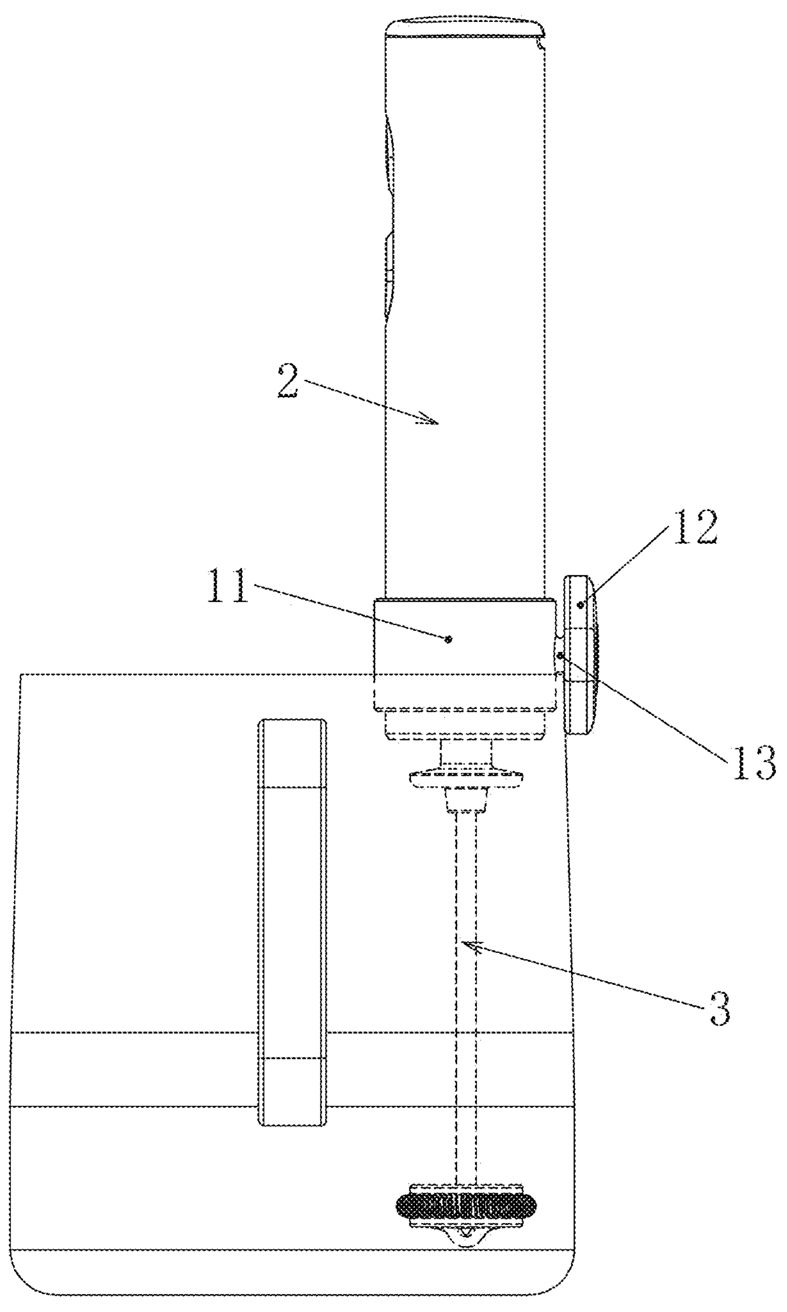
FIG. 2 is a structural schematic diagram of FIG. 1 from side view.
Figure 3:
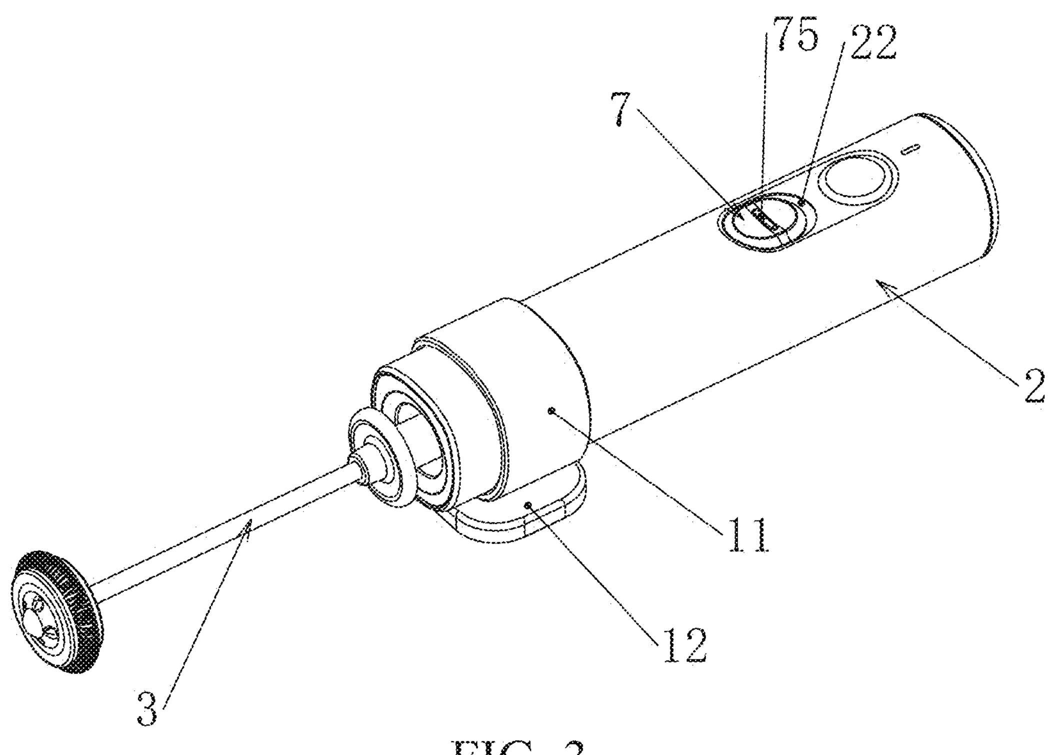
FIG. 3 is a structural schematic diagram of the present invention.
Figure 4:
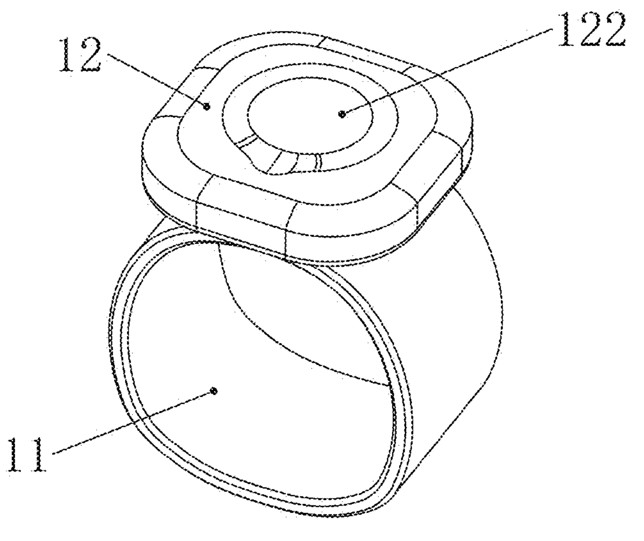
FIG. 4 is a structural schematic diagram of a connecting member.
Figure 5:
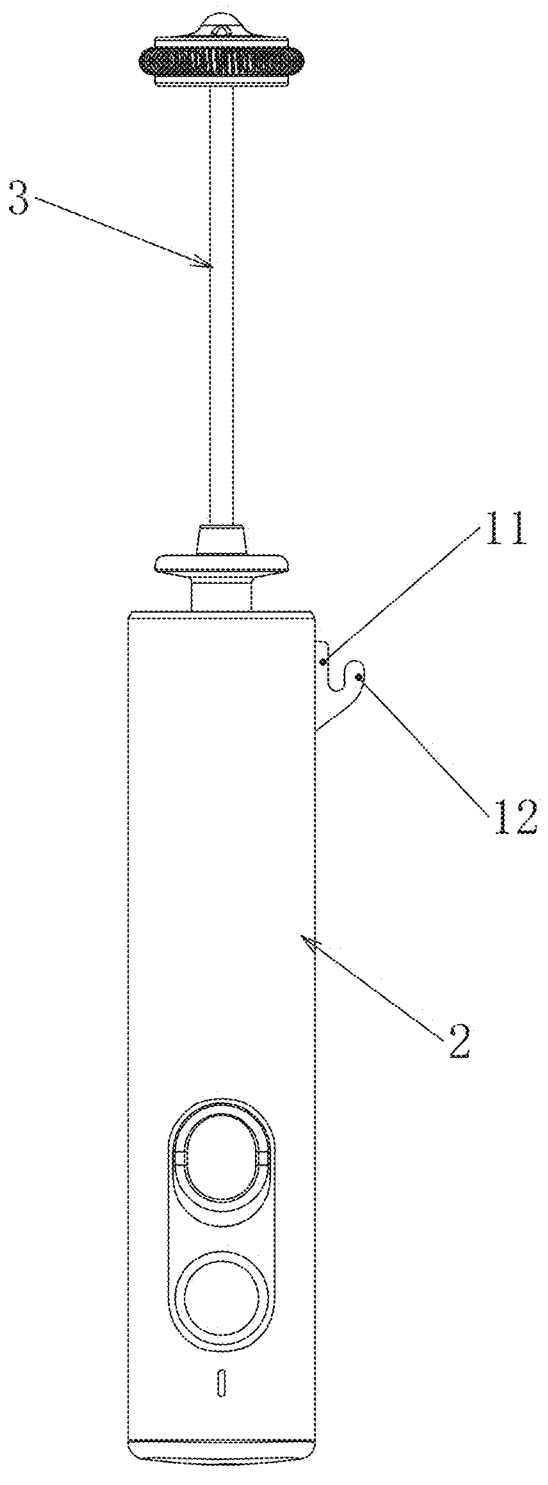
FIG. 5 is a structural schematic diagram of integral formation of a connecting member and a handle.

11—First connecting portion;
12—Limiting portion;
122—Supporting surface;
13—Mounting portion;
2—Handle;
21—First connecting groove;
22—Storage groove;
23—Long-strip hole;
3—Whipping head;
31—Spring;
32—Connecting rod;
33—Mounting disk;
331—Mounting groove;
332—Drainage hole;
333—Protrusion portion;
334—Groove;
34—Mounting member;
341—Snap-fit port;
342—Convex plate;
343—Channel;
345—Convex strip;
35—Connecting ring;
36—Second connecting portion;
361—Second connecting groove;
37—Flat wire whisk;
38—Reinforcing rib;
381—First reinforcing strip;
382—Second reinforcing rib;
4—Motor;
41—Driving shaft;

5—Connecting member;
51—Fastener;
6—Circuit board;
61—Contact;
7—Push member;
71—Push plate;
72—Connecting plate;
73—Clamping block;
74—Push portion;
8—Sealing ring;
9—Power supply.

DETAILED DESCRIPTION OF EMBODIMENTS

The specific embodiments of the present invention are described in more detail with reference to the accompanying drawings.

As shown in FIG. 1 to FIG. 15, a hand mixer capable of being hung on a cup wall includes a handle 2, and an outer side of the handle 2 is connected to a connecting member. Meanwhile, the connecting member includes a first connecting portion 11 and a limiting portion 12, the limiting portion 12 is provided with a gap for accommodating the cup wall, the first connecting portion 11 is connected to the handle 2, and the first connecting portion 11 can move synchronously with the limiting portion 12 or/and the first connecting portion 11 can move relative to the limiting portion 12.

The first connecting portion 11 can move because the gap is larger than the cup wall, thereby having a certain space for movement. Therefore, during actual use, the limiting portion 12 is matched with the cup wall through the gap, so that the hand mixer is hung on the cup wall, long-time holding is avoided, and a collision between the whipping head and the cup bottom is avoided. Furthermore, the first connecting portion 11 moves to enable the handle 2 to move so as to change the stirring position and facilitate stirring. Specifically, the first connecting portion 11 can move synchronously with the limiting portion 12 so as to enable the handle 2 to move and slide to change the stirring position of the handle 2, or/and the first connecting portion 11 can move relative to the limiting portion 12 to enable the handle 2 to move, so that the handle 2 inclines and swings in different direction to change the stirring position of the handle 2.

Furthermore, the handle 2 can move in one direction, that is, the first connecting portion 11 can drive the handle 2 to swing forward and backward in a direction close to the center of a cup, or the first connecting portion 11 can drive the handle 2 to swing left and right in a plane perpendicular to the direction close to the center of the cup, or in two directions, that is, both of the above, so the handle can swing forward, backward, left and right.

Or a pivot point is arranged between the first connecting portion 11 and the limiting portion 12, and the first connecting portion 11 can drive the handle 2 to swing in forward, backward, left, right, upward and downward directions by taking the pivot point as a rotating center.

Meanwhile, the structure of the first connecting portion 11 may be elastic and deformable, or at least one hinge shaft or hinge ball is arranged between the first connecting portion 11 and the limiting portion 12, or a combination of both.

Secondly, as one of the preferred manner, the gap includes a clamping gap and a swinging gap which are distributed up and down, and the width of the swinging gap is greater than the width of the clamping gap. In such a case, the swinging amplitude of the swinging gap or the connecting portion may be set relatively large, the handle can be positioned at one position of the cup wall through the clamping gap, and the direction of the handle can be controlled accurately and conveniently.

As another preferred manner, the gap is configured as a sliding gap for the connecting member to slide relative to the cup wall, so that the position of the handle can be changed conveniently during stirring.

As shown in FIG. 1 to FIG. 15, the connection between the first connecting portion 11 and the handle 2 may be implemented in many ways, the first connecting portion 11 and a shell of the handle 2 may be integrally formed, or the first connecting portion 11 and the handle 2 may be detachably connected.

When the first connecting portion 11 and the handle 2 are detachably connected, the specific connection way is: the first connecting portion 11 and the handle 2 are magnetically attracted by each other; or the first connecting portion 11 is sleeved outside the handle 2; or the first connecting portion 11 is embedded on the handle 2.

Meanwhile, the structure of the limiting portion 12 may be that the gap is formed at the bottom of the limiting portion 12, or may be that the limiting portion 12 is a supporting plate, the limiting portion 12 is connected to the first connecting portion 11 through a mounting portion 13, and a gap is formed between the limiting portion 12 and the first connecting portion 11.

When the limiting portion 12 is the supporting plate, a supporting surface 122 is formed at the bottom of the limiting portion 12. Therefore, during actual use, the supporting surface 122 abuts against a placed article, so that the hand mixer is horizontally placed above the placed article, and the handle 2 and the whipping head 3 are located above the placed article, that is, there is a distance between the two and an upper surface of the placed article, thereby avoiding the situation that the handle 2 will roll when being placed horizontally, preventing the whipping head 3 from being in contact with the placed article, and preventing the whipping head 3 from being polluted and growing bacteria. Furthermore, the hand mixer is stably placed, so that an operator can free his/her hands to do other operations.

Meanwhile, an inclined surface is formed at the bottom of the supporting portion 12 and outside the supporting surface 122. Therefore, during actual use, the bottom of the supporting portion 12 is not completely attached to the placed article through the inclined surface, thereby facilitating the subsequent separation of the supporting portion 12 from the placed article.

Secondly, corresponding to the structure between the first connecting portion 11 and the handle 2, when the limiting portion 12 is the supporting plate, the first connecting portion 11 is ring-shaped so as to be directly sleeved or embedded. Or the first connecting portion 11 is made of an elastic material, and an opening is formed in one side of the first connecting portion 11 away from the limiting portion 12, so that the first connecting portion can be directly sleeved or embedded. As shown in FIG. 6 to FIG. 15, the hand mixer further includes a whipping head 3, the whipping head 3 is arranged on the handle 2, and the whipping head 3 has various structures. The first structure is: as shown in FIG. 6 to FIG. 11, firstly, the whipping head 3 includes a spring 31, a connecting rod 32 and a mounting disk 33, and one end of the connecting rod 32 is connected to the mounting disk 33 and the other end of the connecting rod 32 is connected to the handle 2.

Meanwhile, a mounting groove 331 is formed outside the mounting disk 33, the mounting disk 33 is at least provided with one drainage hole 332 for communicating upper and lower surfaces, and the spring 31 is sleeved outside the mounting disk 33 and located in the mounting groove 331. The spring 31 may be ring-shaped, or have other shapes.

Therefore, during actual use, due to the elasticity of the spring 31, the spring 31 can be removed by pulling. Specifically, the spring 31 is pulled outward to enlarge the opening enclosed by the spring 31, so that the spring 31 can be removed from the mounting disk 33, and the spring 31 is detachable. Therefore, the spring can be cleaned separately during cleaning to be washed completely, and the spring can be replaced separately if the spring is broken.

Moreover, through the arrangement of the drainage hole 332, liquid can directly pass through the mounting disk 33 and flow from a lower surface (a surface of a side away from the connecting rod 32) of the mounting disk to an upper surface. Furthermore, in the flowing process, an annular vortex in up, down, inside and outside directions is formed for the liquid, so liquid flows to achieve liquid exchange, and the annular vortex is beneficial for the liquid to be rapidly mixed with the air to achieve primary whipping, that is, the liquid subsequently whipped by the spring 31 continuously is primarily whipped, thereby achieving a better whipping effect, instead of bypassing the mounting disk 33 and flowing from the lower surface of the mounting disk 33 to the upper surface. Moreover, a plurality of drainage holes 332 may be provided, thereby facilitating the flowing of the liquid.

Meanwhile, the arrangement of the drainage hole 332 can also avoid liquid residue and facilitate cleaning. Therefore, after the liquid is whipped, the whipping head 3 is taken out of the liquid, the liquid located on the mounting disk 33 passes through the drainage hole 332 and converges with the liquid below, so that the liquid is prevented from remaining on the mounting disk 33. Furthermore, when the whipping head 3 is cleaned, water flow can impact the interior of the mounting disk 33 and flow out of the drainage hole 332, thereby improving the cleaning efficiency and reducing the possibility of liquid or bacteria accumulating on the mounting disk 33.

Figure 6:
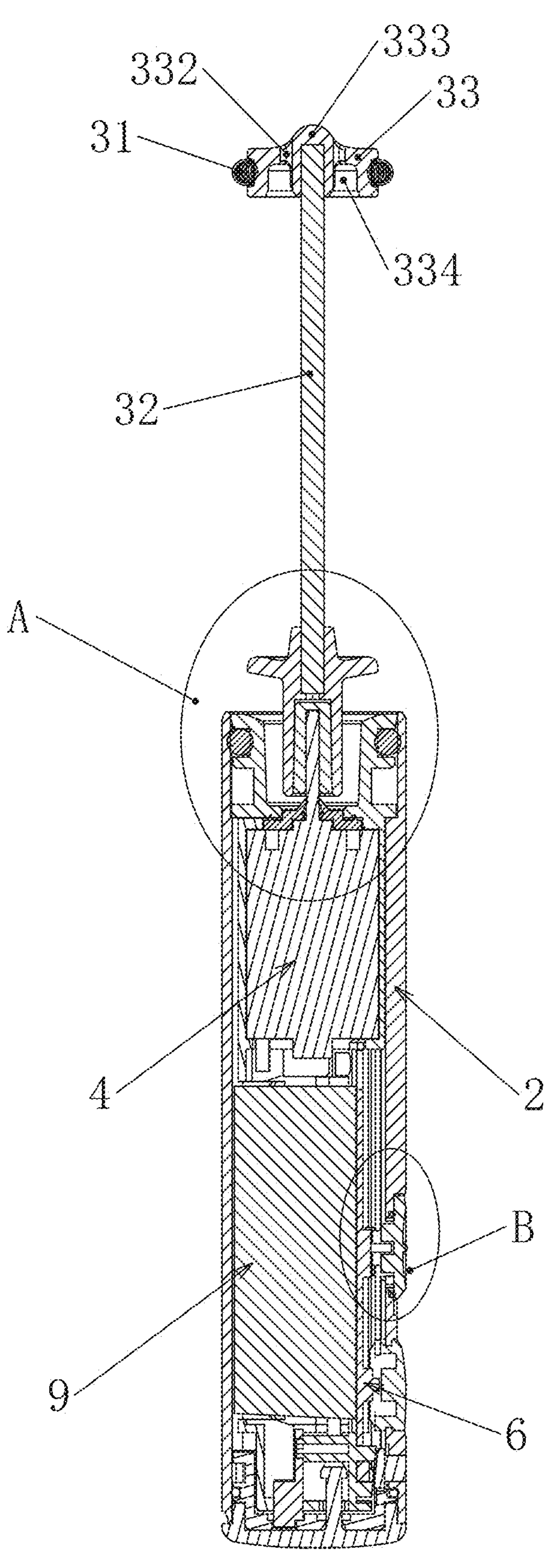
FIG. 6 is a structural schematic diagram of a hand mixer from sectional view.
Figure 8:
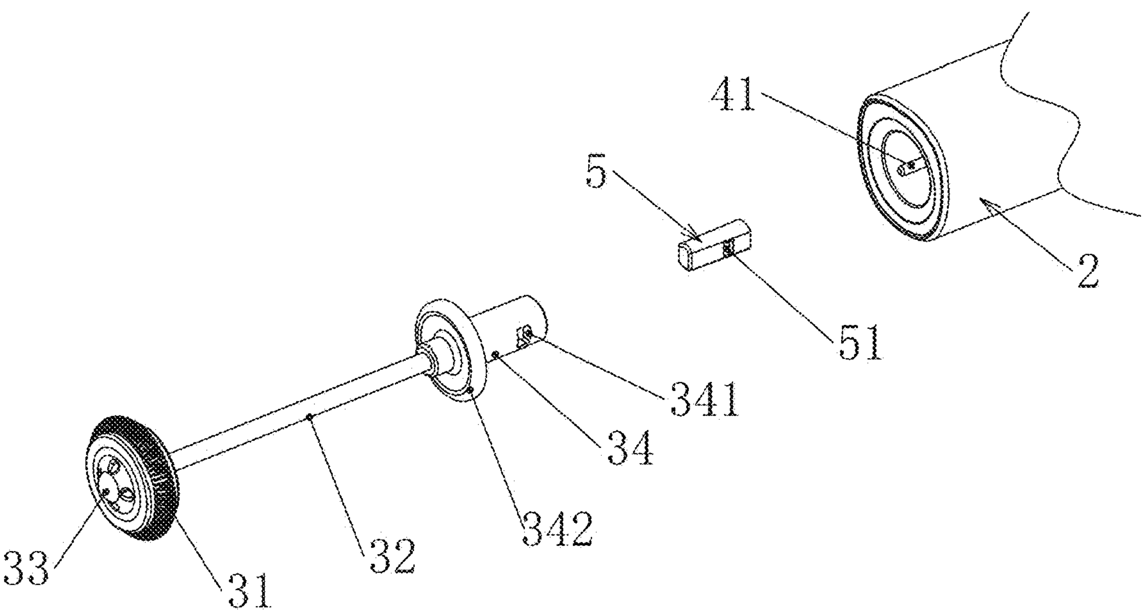
FIG. 8 is a schematic diagram of a structure between a whipping head and a handle.
Figure 9:
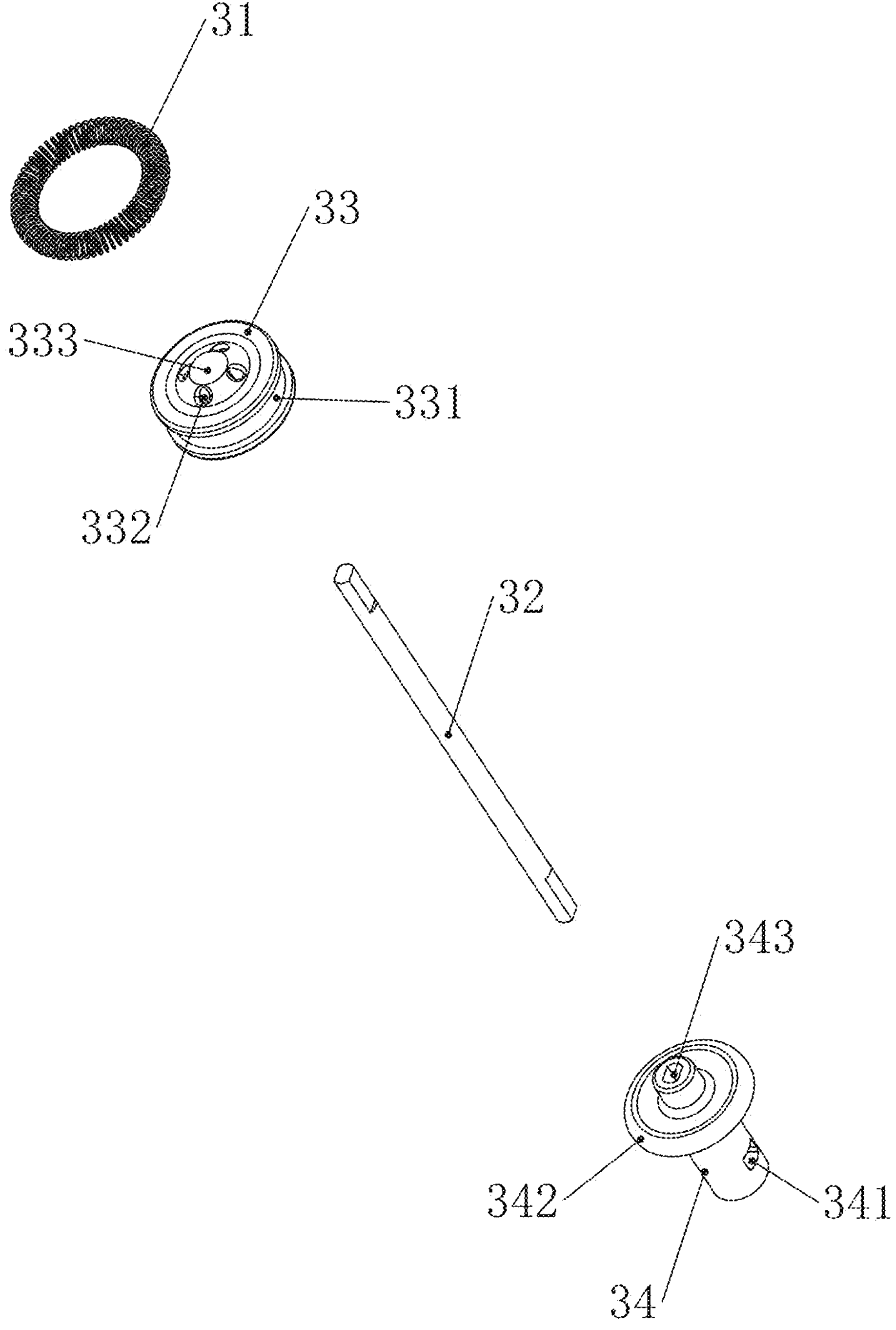
FIG. 9 is a schematic diagram of a split structure of a whipping head.

As shown in FIG. 6, FIG. 8 and FIG. 9, a protrusion portion 333 is arranged on one side of the mounting disk 33 away from the connecting rod 32, an outer surface of the protrusion portion 333 is arc-shaped, an inclined surface is arranged between the protrusion portion 333 and the mounting disk 33, and the inclined surface is provided with the drainage hole 332.

Therefore, during actual use, the protrusion portion 333 is in contact with the cup bottom, thereby reducing the contact between the lower surface of the mounting disk 33, that is, one side away from the connecting rod 32, and the cup bottom. Specifically, when the liquid is whipped, the general professional whipping method is to suspend the whipping head 3 in the liquid and achieve whipping by continuously adjusting the position of the whipping head 3, that is, at the center position or eccentric position. Due to the different heights of containers, if an inexperienced operator accidentally contacts the whipping head 3 with the bottom of the container with liquid, the protrusion portion 333 of the present invention is arc-shaped, and the arc-shaped protrusion portion 333 has small friction, so the normal use of the whipping head 3 is not affected, and a fault-tolerant effect is achieved for the inexperienced operator.

Meanwhile, the arc-shaped arrangement can reduce the resistance to fluid in the whipping process, thereby helping to whip the liquid into microfoam. Moreover, the arrangement of the inclined surface may play the role of drainage, and the part of the outer surface of the protrusion portion 333 connected to the mounting disk 33 may be set to be connected to an inner wall of the drainage hole 332, thereby having a better drainage effect.

Secondly, a groove 334 is formed in one side of the mounting disk 33 close to the connecting rod 32, and the groove 334 communicates with the drainage hole 332. Therefore, during actual use, through the arrangement of the groove 334, liquid passing through the drainage hole 332 is gathered together and then merged with the liquid located on the upper surface of the mounting disk 33.

As shown in FIG. 12 to FIG. 15, the second structure of the whipping head 3 is: firstly, the whipping head 3 includes a connecting ring 35 and a connecting rod 32, and one end of the connecting rod 32 is connected to the handle 2.

Meanwhile, at least one reinforcing rib 38 and a second connecting portion 36 for being connected to the connecting rod 32 are arranged inside the connecting ring 35, a flat wire whisk 37 is arranged between an inner wall of the connecting ring 35 and the second connecting portion 36, and the reinforcing rib 38 is located on one side of the flat wire whisk 37 away from the connecting rod 32.

Therefore, during actual use, the arrangement of the flat wire whisk 37 achieves whipping; compared with the spring, the flat wire whisk 37 is convenient to clean; and through the arrangement of the reinforcing rib 38, the strength can be enhanced, and the service life can be prolonged. The number of the reinforcing ribs 38 may be selected according to the actual requirement, and is three in the drawings.

Moreover, for the convenience of processing, mounting and reducing mounting gaps among components, the reinforcing rib 38, the second connecting portion 36 and the connecting ring 35 may be integrally formed, or the reinforcing rib 38, the second connecting portion 36, the connecting ring 35 and the flat wire whisk 37 may be designed by injection molding, that is, may adopt secondary injection molding.

Therefore, during actual use, through integral formation to process and mount, the mounting gaps among the components are reduced, that is, cleaning dead angles are reduced to facilitate cleaning.

Figure 16:
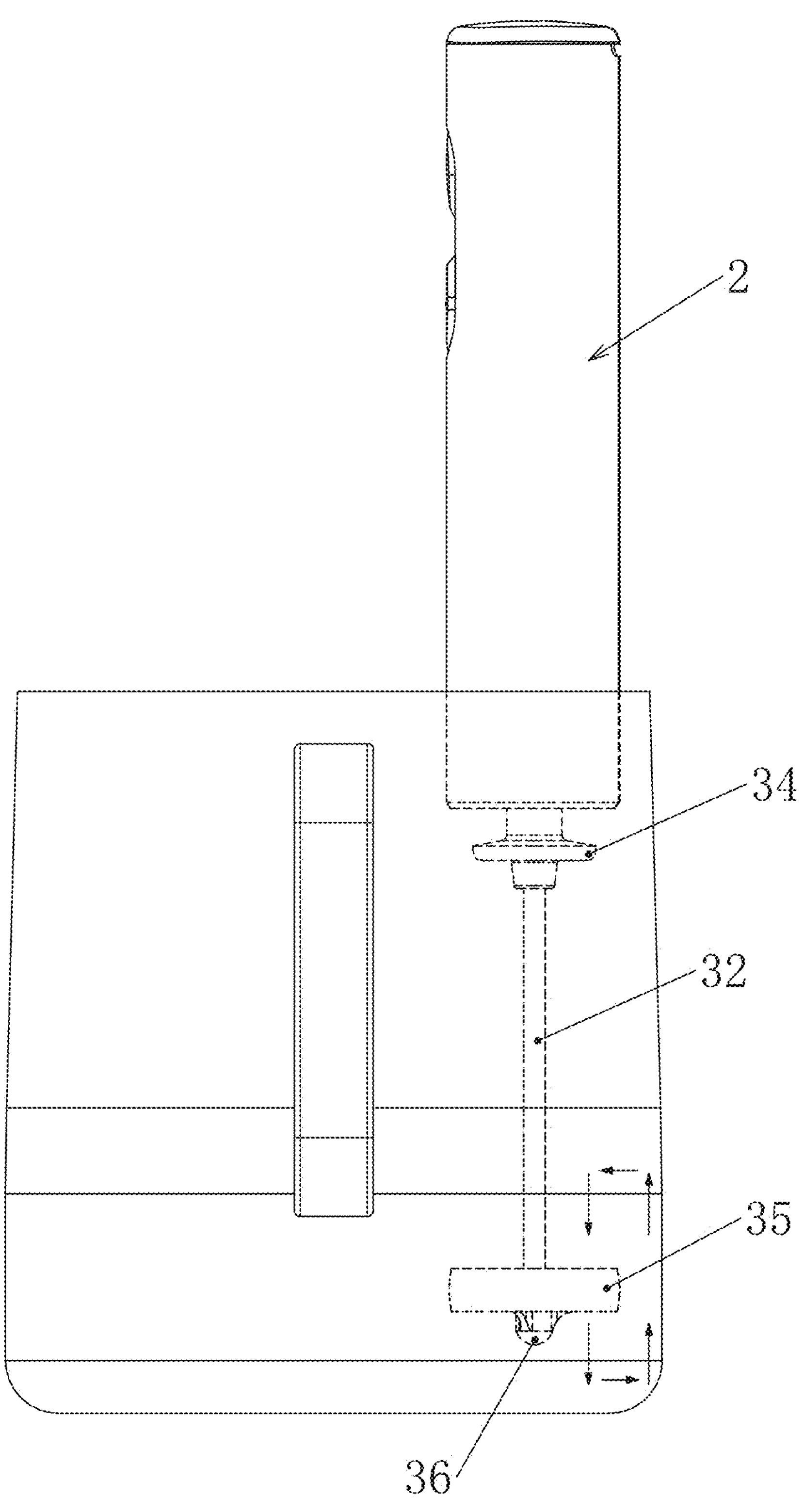
FIG. 16 is a structural schematic diagram of FIG. 12 and a cup.

Secondly, the flat wire whisk 37 is arranged at ¼ to ⅔ of the height of the connecting ring 35, more preferably, at ¼ to ½ of the height, so the position of the flat wire whisk 37 is closer to the lower surface (a surface of a side away from the connecting rod 32) of the connecting ring 35, that is, closer to the cup bottom as shown in FIG. 16, so that the space between the flat wire whisk 37 and the upper surface of the connecting ring 35 is larger. Therefore, during whipping, liquid interacts with the whipping head 3 according to the movement path shown in FIG. 16 under the action of the centrifugal force and gravity, and a larger space (the space here refers to the space between the flat wire whisk 37 and the upper surface of the connecting ring 35) can better receive the falling liquid, so that the liquid is in contact with the flat wire whisk 37 more completely for whipping, thereby improving the effective rate and the velvety texture of the whipping. However, a smaller space will cause the liquid not to be whipped by the flat wire whisk 37 to flow repeatedly so as to generate larger foam, thereby damaging the whipping texture.

Meanwhile, the height of the connecting ring 35 is greater than or equal to 5 mm, such as 8 to 10 mm. Therefore, after the whipping head is immersed in the liquid, the higher the height of the connecting ring 35 is, the larger the contact area of the connecting ring 35 and the liquid is. Compared with the working state in which the single flat wire whisk 37 (that is, the connecting ring 35 is not provided) rotates alone, the arrangement of the connecting ring 35 can enlarge the vortex generated by the liquid during whipping, thereby increasing the flow speed and shortening the whipping time.

Figure 13:
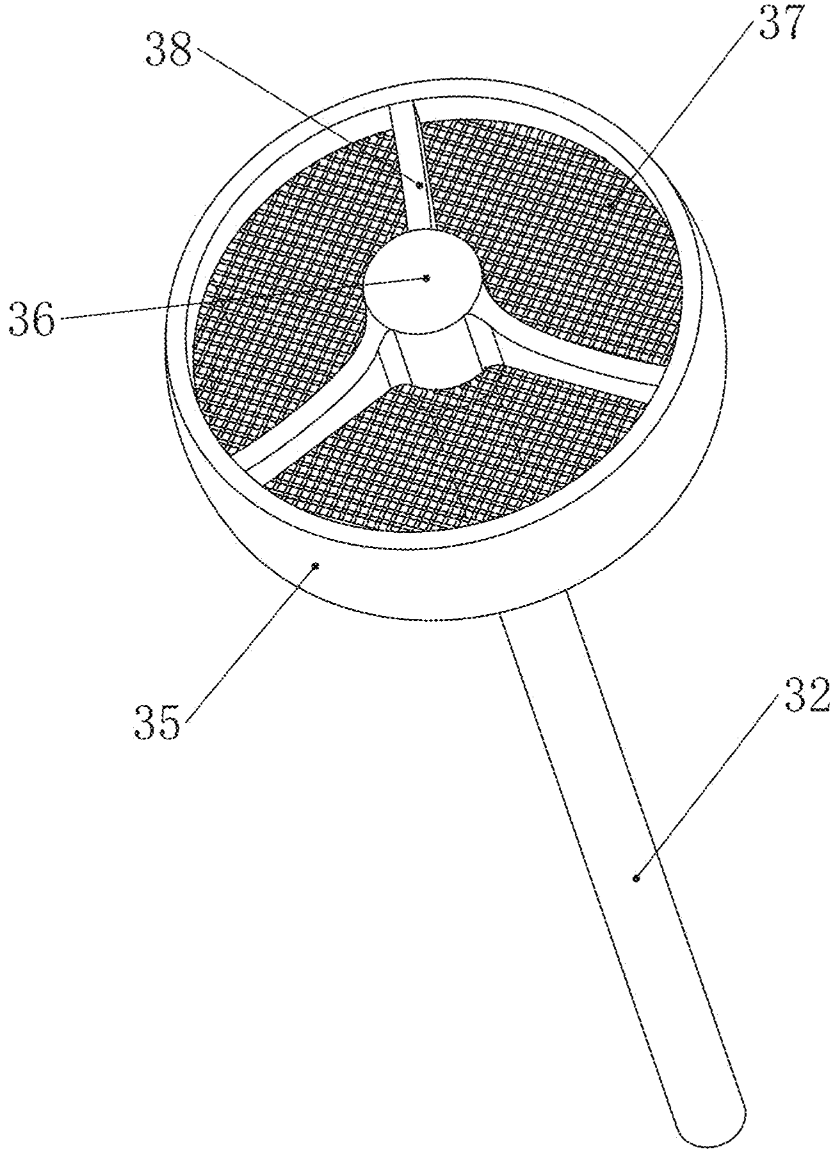
FIG. 13 is a structural schematic diagram of a reinforcing rib being a long strip.
Figure 14:
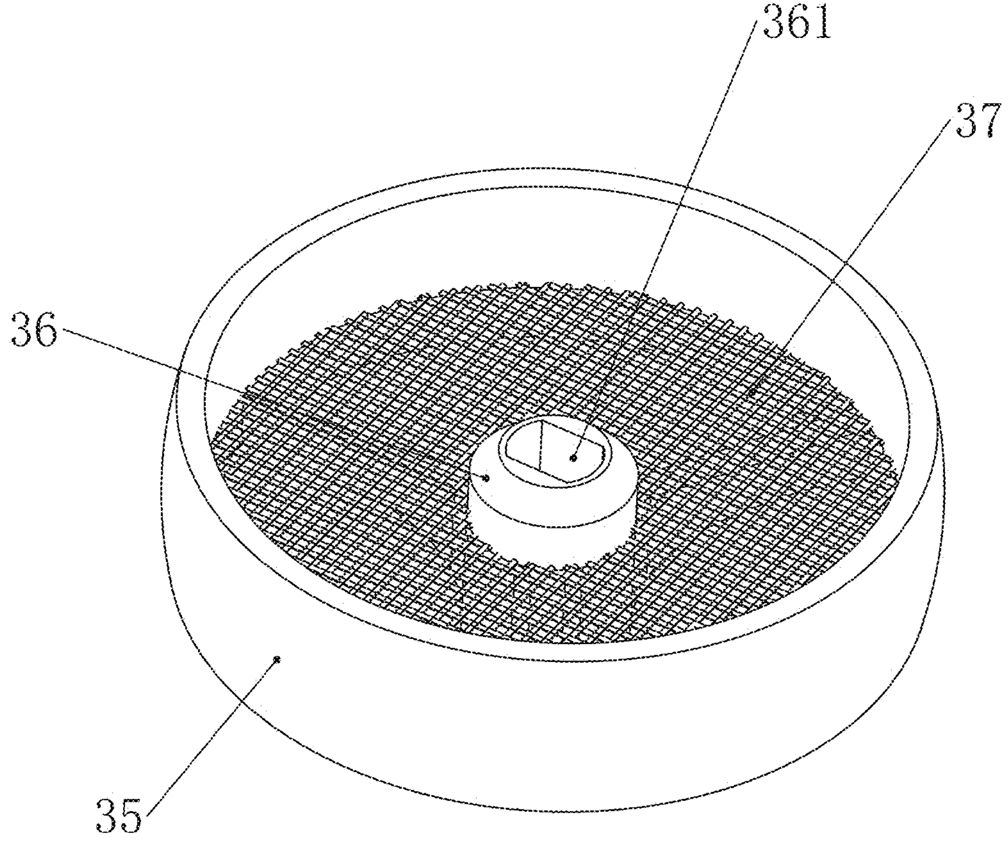
FIG. 14 is a schematic diagram of a partial structure of FIG. 13.
Figure 15:
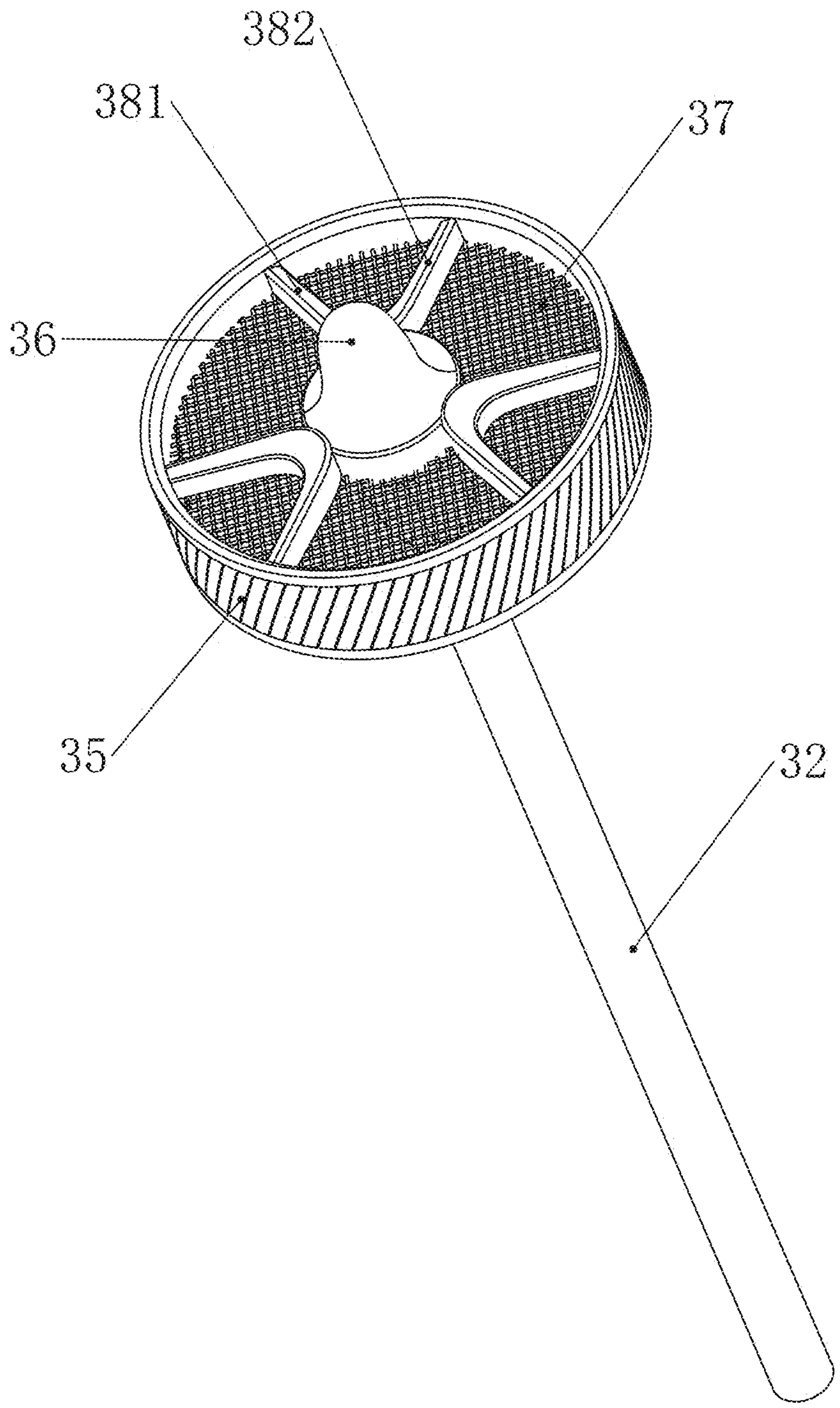
FIG. 15 is a structural schematic diagram of a reinforcing rib being V-shaped.

As shown in FIG. 13 and FIG. 15, the reinforcing rib 38 has various structures. The reinforcing rib 38, as shown in FIG. 13, may be a long strip and located between the inner wall of the connecting ring 35 and the second connecting portion 36, one side of the reinforcing rib 38 away from the flat wire whisk 37 is a cambered surface, and the height of the reinforcing rib 38 is gradually increased in a direction close to the second connecting portion 36. Therefore, during actual use, through the arrangement of the cambered surface, drainage and guidance are achieved, that is, when the whipping head 3 stops rotating, liquid remaining on the whipping head 3 can fall along the cambered surface.

The reinforcing rib 38, as shown in FIG. 15, may also be V-shaped and includes a first reinforcing rib 381 and a second reinforcing strip 382, the joint of the first reinforcing strip 381 and the second reinforcing strip 382 is connected to the second connecting portion 36, and the other ends of the first reinforcing strip 381 and the second reinforcing strip 382 are connected to the inner wall of the connecting ring 35. Furthermore, one side of the first reinforcing strip 381 and one side of the second reinforcing strip 382 away from the flat wire whisk 37 are inclined surfaces, and the height of the reinforcing strip 38 is gradually increased in the direction close to the second connecting portion 36.

Therefore, during actual use, through the V-shaped arrangement, the strength can be further enhanced, thereby prolonging the service life; and through the arrangement of the inclined surfaces, drainage and guidance are achieved, that is, when the whipping head 3 stops rotating, liquid remaining on the whipping head 3 can fall along the inclined surfaces.

Secondly, the related structure of the second connecting portion 36 is: firstly, the height of one end of the second connecting portion 36 away from the connecting rod 32 is greater than the height of a lower surface of the connecting ring 35, and an outer surface of the end of the second connecting portion 36 is a cambered surface.

Therefore, during actual use, through the height arrangement, the second connecting portion 36 is in contact with the cup bottom, thereby reducing the contact between the lower surface of the connecting ring 35, that is, one side away from the connecting rod 32, and the cup bottom. Furthermore, the arrangement of the cambered surface can reduce friction, so that the normal use of the whipping head 3 is not affected, and a fault-tolerant effect is achieved for inexperienced operators. Meanwhile, the arrangement of the cambered surface can reduce the resistance to fluid in the whipping process, thereby helping to whip the liquid into microfoam.

Meanwhile, a second connecting groove 361 is formed at one end of the second connecting portion 36 close to the connecting rod 32, a first plane is formed on two sides of an inner wall of the second connecting groove 361, an end part of the connecting rod 32 is located in the second connecting groove 361, and a second plane is formed outside the end part of the connecting rod 32 corresponding to the first plane.

Therefore, during actual use, the end part of the connecting rod 32 is located in the second connecting groove 361, so that connection is achieved; and through the arrangement of the planes, the relative rotation between the second connecting portion 36 and the connecting rod 32 is limited.

Figure 7:
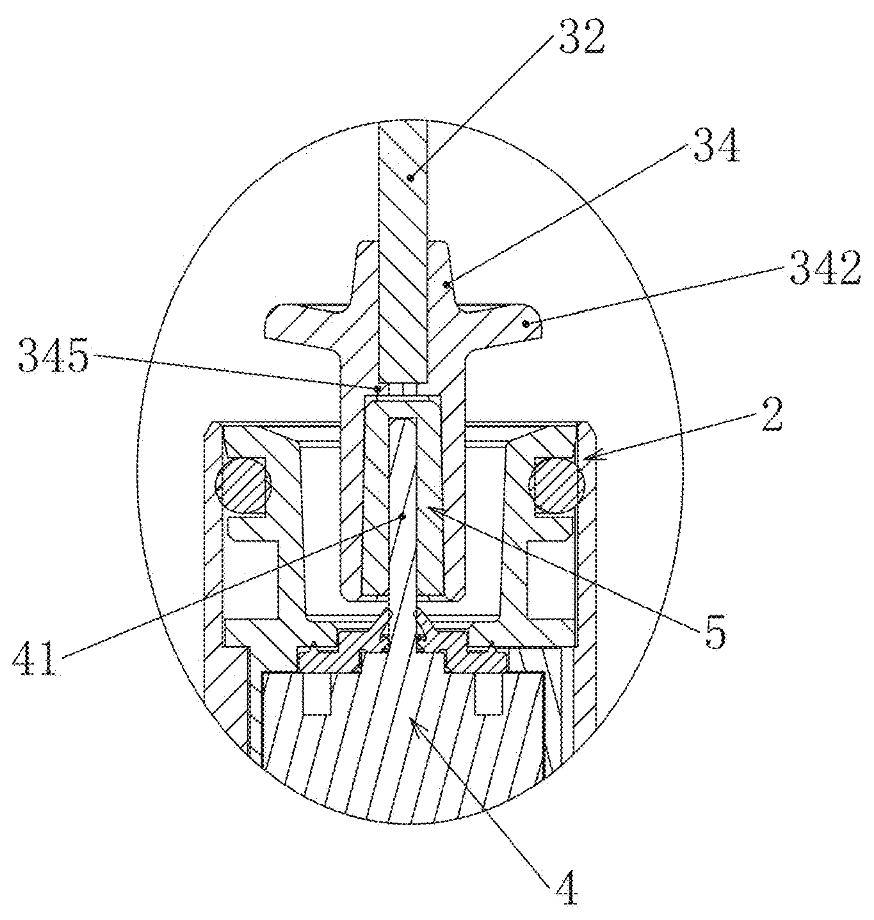
FIG. 7 is an enlarged structural schematic diagram of a part A in FIG. 6.

As shown in FIG. 6 to FIG. 8, the whipping head 3 is detachably arranged on the handle 2, and the specific structure is: firstly, a motor 4 is arranged in the handle 2, a driving shaft 41 is arranged at one end of the motor 4, and the driving shaft 41 passes through the handle 2 to be exposed. Meanwhile, a connecting member 5 is sleeved at one exposed end of the driving shaft 41, a fastener 51 is arranged outside the connecting member 5, a mounting member 34 is arranged at one end of the whipping head 3 connected to the handle 2, and the mounting member 34 is provided with a snap-fit port 341.

Therefore, during actual use, the mounting member 34 is sleeved outside the connecting member 5, and the fastener 51 is located in the snap-fit port 341, so that the whipping head 3 can be mounted; and when the whipping head is required to be disassembled, the whipping head can be pulled outward. Therefore, the whipping head 3 is detachably arranged on the handle 2, so that the whipping head can be disassembled and cleaned, thereby reducing the contact between the handle and water, and facilitating the replacement of the whipping head 3.

Furthermore, a convex plate 342 is arranged outside the mounting member 34, and the height of one end of the convex plate 342 close to the mounting member 34 is less than the height of one end of the convex plate 342 away from the mounting member 34. Therefore, during actual use, the convex plate 342 can limit the flow, that is, limit the liquid from flowing to the handle 2, thereby protecting the handle 2. Moreover, the convex plate 342 is inclined, that is, a structure with a high exterior and a low interior, so that the liquid flows inward, instead of flowing outward to the handle 2.

Meanwhile, the specific structure of the mounting member 34 is: firstly, a channel 343 is formed in the middle of the mounting member 34, a convex strip 345 is arranged on an inner wall of the channel 343, and the snap-fit port 341 is formed outside the mounting member 34 and below the convex strip 345. Therefore, during actual use, one end of the whipping head 3 connected to the handle 2 is located in the channel 343 and on the convex strip 345, injection molding is adopted between the whipping head 3 and the mounting member 34, and the connecting member 5 is located in the channel 343 and below the convex strip 345.

Figure 10:
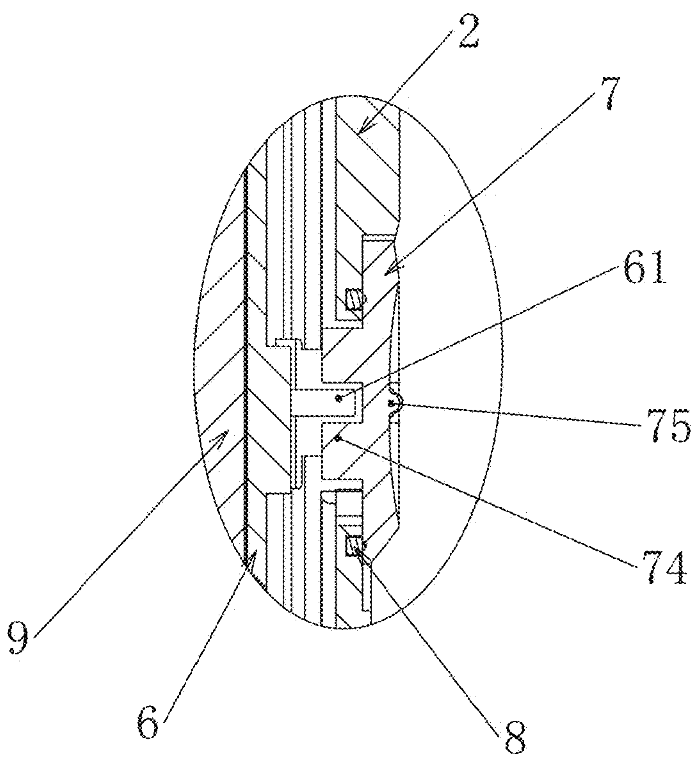
FIG. 10 is an enlarged structural schematic diagram of a part B in FIG. 6.
Figure 11:
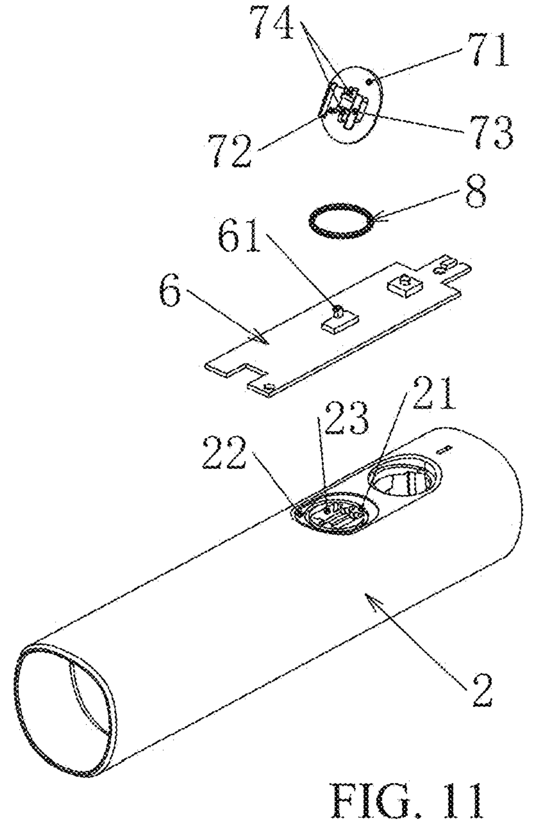
FIG. 11 is a schematic diagram of a related structure of a circuit board.
Figure 12:
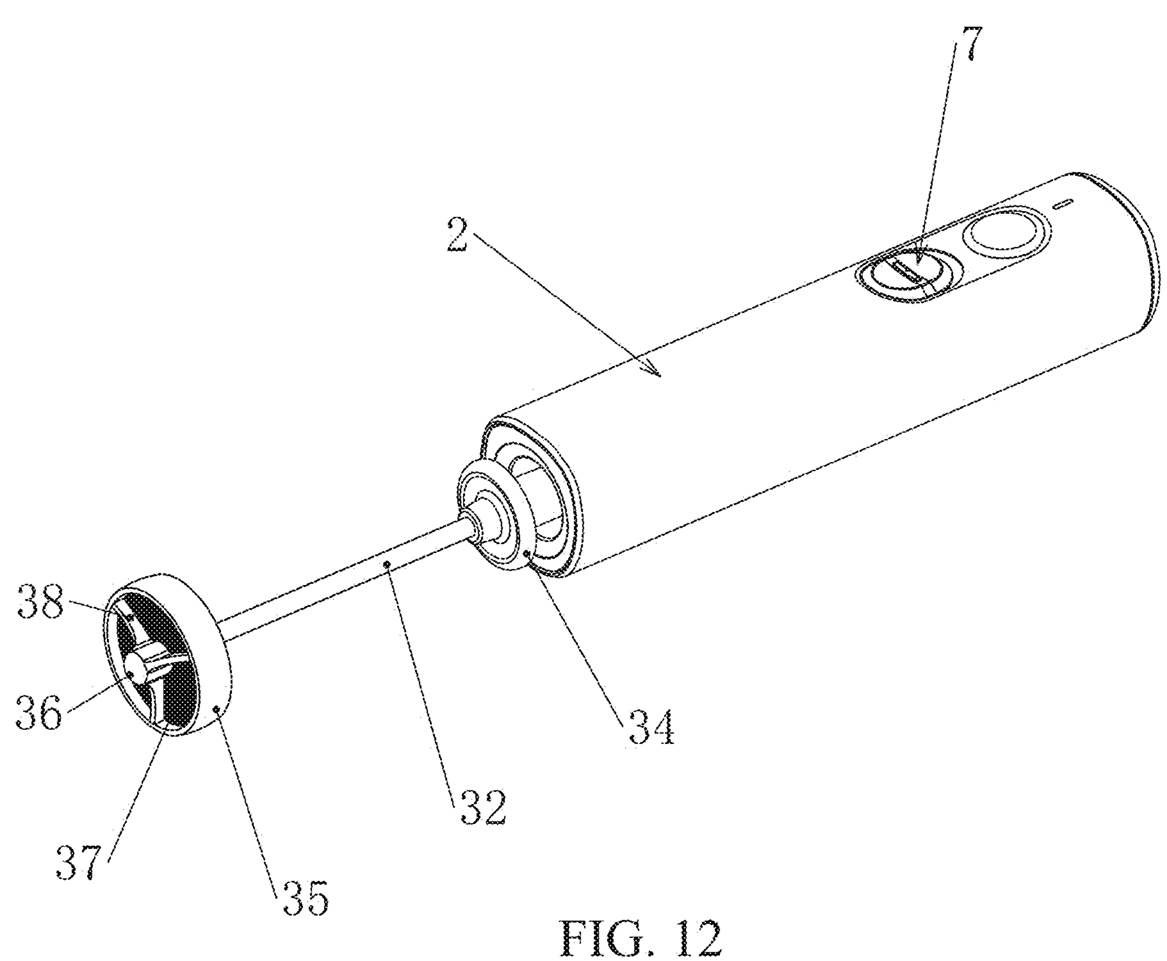
FIG. 12 is a schematic diagram of a structure with a flat wire whisk.

As shown in FIG. 6, FIG. 10 and FIG. 11, a motor 4 and a circuit board 6 are arranged inside the handle 2, and the motor 4 is connected to the whipping head 3 and electrically connected to the circuit board 6. Therefore, during actual use, the motor 4 will drive the whipping head 3 to rotate after receiving information sent by the circuit board 6.

Meanwhile, a contact 61 is arranged on the circuit board 6, the handle 2 is provided with a push member 7 corresponding to the contact 61, the push member 7 includes a push plate 71 and push portions 74 arranged at the bottom of the push plate 71, and the push member 7 is pushed to contact the push portions 74 with the contact 61 so as to send information to the circuit board 6, that is, information that the circuit board 6 is driven by the motor 4. Two push portions 74 are provided, and the contact 61 is located between the two push portions.

Secondly, other structures of the push member 7 are: firstly, two connecting plates 72 are symmetrically arranged at the bottom of the push plate 71, and a clamping block 73 is arranged at one end of each of the connecting plates 72 away from the push plate 71. Therefore, during actual use, one end of each of the connecting plates 72 away from the push plate 71 passes through the handle 2 and is located in the handle 2, and the clamping block 73 abuts against the inner wall of the handle 2 so as to prevent the push member 7 from being separated from the handle 2. Furthermore, for airtightness, a sealing ring 8 is arranged between the push plate 71 and the outer side of the handle 2.

Moreover, the handle 2 is provided with a storage groove 22 for placing the push plate 71 and for the push plate 71 to move, the handle 2 is provided with a long-strip hole 23 for the connecting plates 72 to pass through and move, and the handle 2 is provided with a first connecting groove 21 for placing the sealing ring 8.

Meanwhile, the top of the push plate 71 is slotted to facilitate finger insertion, and a protrusion 75 is arranged in the groove, so that friction is increased to facilitate pushing.

As shown in FIG. 6, a power supply 9 is arranged inside the handle 2, the power supply 9 is configured to provide power for the motor 4, the handle 2 includes a shell, an upper cover plate and a lower cover plate, the upper cover plate and the lower cover plate are located in the shell, a sealing member is arranged between the upper cover plate and the lower cover plate, a cover and a charging port are arranged outside the lower cover plate, and the cover is configured to protect the charging port.

Meanwhile, the driving shaft 41 passes through the upper cover plate to be exposed, the upper cover plate is slotted to enable the exposed end of the driving shaft 41 and the connecting member 5 to be mostly located in the groove, thereby playing a protection role. Furthermore, the sealing ring 8 is arranged between the push plate 71 and the shell, and the clamping block 73 abuts against the inner wall of the shell.

The above displays and describes the basic principles, the main features and the advantages of the present invention. Meanwhile, the present invention is not limited by the above embodiments, so the present invention will have various changes and improvements without departing from the principle and scope of The present invention, and these changes and improvements will fall within the protection scope of The present invention.

The invention claimed is:

1. A hand mixer capable of being hung on a cup wall, comprising a handle, wherein an outer side of the handle is connected to a connecting member; and the connecting member comprises a first connecting portion and a limiting portion, the limiting portion is provided with a gap for accommodating the cup wall, the first connecting portion is connected to the handle, and the first connecting portion is capable of moving synchronously with the limiting portion or/and the first connecting portion is capable of moving relative to the limiting portion;

wherein the limiting portion is a supporting plate, the limiting portion is connected to the first connecting portion through a mounting portion, and the gap is formed between the limiting portion and the first connecting portion; and wherein a supporting surface is formed at a bottom of the limiting portion, and an inclined surface is formed at the bottom of the limiting portion outside the supporting surface.

2. The hand mixer capable of being hung on a cup wall according to claim 1, wherein a pivot point is arranged between the first connecting portion and the limiting portion, and the first connecting portion is capable of driving the handle to swing in forward, backward, left, right, upward and downward directions by taking the pivot point as a rotating center;

or the first connecting portion is capable of driving the handle to swing forward and backward in a direction close to the center of a cup, or/and the first connecting portion is capable of driving the handle to swing left and right in a plane perpendicular to the direction close to the center of the cup.

3. The hand mixer capable of being hung on a cup wall according to claim 1, wherein the first connecting portion is elastic and deformable;

or/and at least one hinge shaft or hinge ball is arranged between the first connecting portion and the limiting portion.

4. The hand mixer capable of being hung on a cup wall according to claim 2, wherein the first connecting portion and a shell of the handle are integrally formed;

or the first connecting portion and the handle are detachably connected.

5. The hand mixer capable of being hung on a cup wall according to claim 4, wherein the first connecting portion and the handle are magnetically attracted by each other;

or the first connecting portion is sleeved outside the handle;

or the first connecting portion is embedded on the handle.

6. The hand mixer capable of being hung on a cup wall according to claim 1, wherein the gap comprises a clamping gap and a swinging gap which are distributed up and down, and the width of the swinging gap is greater than the width of the clamping gap.

7. The hand mixer capable of being hung on a cup wall according to claim 1, wherein the gap is configured as a sliding gap for the connecting member to slide relative to the cup wall.

8. The hand mixer capable of being hung on a cup wall according to claim 1, wherein the first connecting portion is ring-shaped;

or the first connecting portion is made of an elastic material, and an opening is formed in one side of the first connecting portion away from the limiting portion.

9. A hand mixer capable of being hung on a cup wall, comprising a handle and a whipping head, wherein an outer side of the handle is connected to a connecting member;

the connecting member comprises a first connecting portion and a limiting portion, the limiting portion is provided with a gap for accommodating the cup wall, the first connecting portion is connected to the handle, and the first connecting portion is capable of moving synchronously with the limiting portion or/and the first connecting portion is capable of moving relative to the limiting portion;

wherein the whipping head is arranged on the handle, the whipping head comprises a spring, a connecting rod and a mounting disk, and one end of the connecting rod is connected to the mounting disk and the other end of the connecting rod is connected to the handle; and a mounting groove is formed outside the mounting disk, the mounting disk is at least provided with a drainage hole for communicating upper and lower surfaces, and the spring is sleeved outside the mounting disk and located in the mounting groove.

10. The hand mixer capable of being hung on a cup wall according to claim 1, further comprising a whipping head, wherein the whipping head is arranged on the handle, the whipping head comprises a connecting ring and a connecting rod, and one end of the connecting rod is connected to the handle; and at least one reinforcing rib and a second connecting portion for being connected to the connecting rod are arranged inside the connecting ring, a flat wire whisk is arranged between an inner wall of the connecting ring and the second connecting portion, and the reinforcing rib is located on one side of the flat wire whisk away from the connecting rod.

11. The hand mixer capable of being hung on a cup wall according to claim 10, wherein the reinforcing rib, the second connecting portion and the connecting ring are integrally formed;

or the reinforcing rib, the second connecting portion, the connecting ring and the flat wire whisk are formed by injection molding.

12. The hand mixer capable of being hung on a cup wall according to claim 11, wherein the reinforcing rib is a long strip and located between the inner wall of the connecting ring and the second connecting portion, one side of the reinforcing rib away from the flat wire whisk is a cambered surface, and the height of the reinforcing rib is gradually increased in a direction close to the second connecting portion;

or the reinforcing rib is V-shaped and comprises a first reinforcing strip and a second reinforcing strip, the joint of the first reinforcing strip and the second reinforcing strip is connected to the second connecting portion, the other ends of the first reinforcing strip and the second reinforcing strip are connected to the inner wall of the connecting ring, one side of the first reinforcing strip and one side of the second reinforcing strip away from the flat wire whisk are inclined surfaces, and the height of the reinforcing rib is increased gradually in a direction close to the second connecting portion.

13. The hand mixer capable of being hung on a cup wall according to claim 10, wherein the flat wire whisk is arranged at ¼ to ⅔ of the height of the connecting ring;

or/and the height of the connecting ring is greater than or equal to 5 mm.

14. A hand mixer capable of being hung on a cup wall, comprising a handle and a whipping head, wherein an outer side of the handle is connected to a connecting member;

the connecting member comprises a first connecting portion and a limiting portion, the limiting portion is provided with a gap for accommodating the cup wall, the first connecting portion is connected to the handle, and the first connecting portion is capable of moving synchronously with the limiting portion or/and the first connecting portion is capable of moving relative to the limiting portion;

the whipping head is arranged on the handle, the whipping head comprises a connecting ring and a connecting rod, and one end of the connecting rod is connected to the handle; and at least one reinforcing rib and a second connecting portion for being connected to the connecting rod are arranged inside the connecting ring, a flat wire whisk is arranged between an inner wall of the connecting ring and the second connecting portion, and the reinforcing rib is located on one side of the flat wire whisk away from the connecting rod.

15. The hand mixer capable of being hung on a cup wall according to claim 14, wherein the reinforcing rib, the second connecting portion and the connecting ring are integrally formed;

or the reinforcing rib, the second connecting portion, the connecting ring and the flat wire whisk are formed by injection molding.

16. The hand mixer capable of being hung on a cup wall according to claim 15, wherein the reinforcing rib is a long strip and located between the inner wall of the connecting ring and the second connecting portion, one side of the reinforcing rib away from the flat wire whisk is a cambered surface, and the height of the reinforcing rib is gradually increased in a direction close to the second connecting portion;

or the reinforcing rib is V-shaped and comprises a first reinforcing strip and a second reinforcing strip, the joint of the first reinforcing strip and the second reinforcing strip is connected to the second connecting portion, the other ends of the first reinforcing strip and the second reinforcing strip are connected to the inner wall of the connecting ring, one side of the first reinforcing strip and one side of the second reinforcing strip away from the flat wire whisk are inclined surfaces, and the height of the reinforcing rib is increased gradually in a direction close to the second connecting portion.

17. The hand mixer capable of being hung on a cup wall according to claim 14, wherein the flat wire whisk is arranged at ¼ to ⅔ of the height of the connecting ring.

18. The hand mixer capable of being hung on a cup wall according to claim 14, wherein the height of the connecting ring is greater than or equal to 5 mm.

* * * * *